(3 Sheets-)
7861X
W. Jones.
Furnace
Patented Dec. 16th 1833
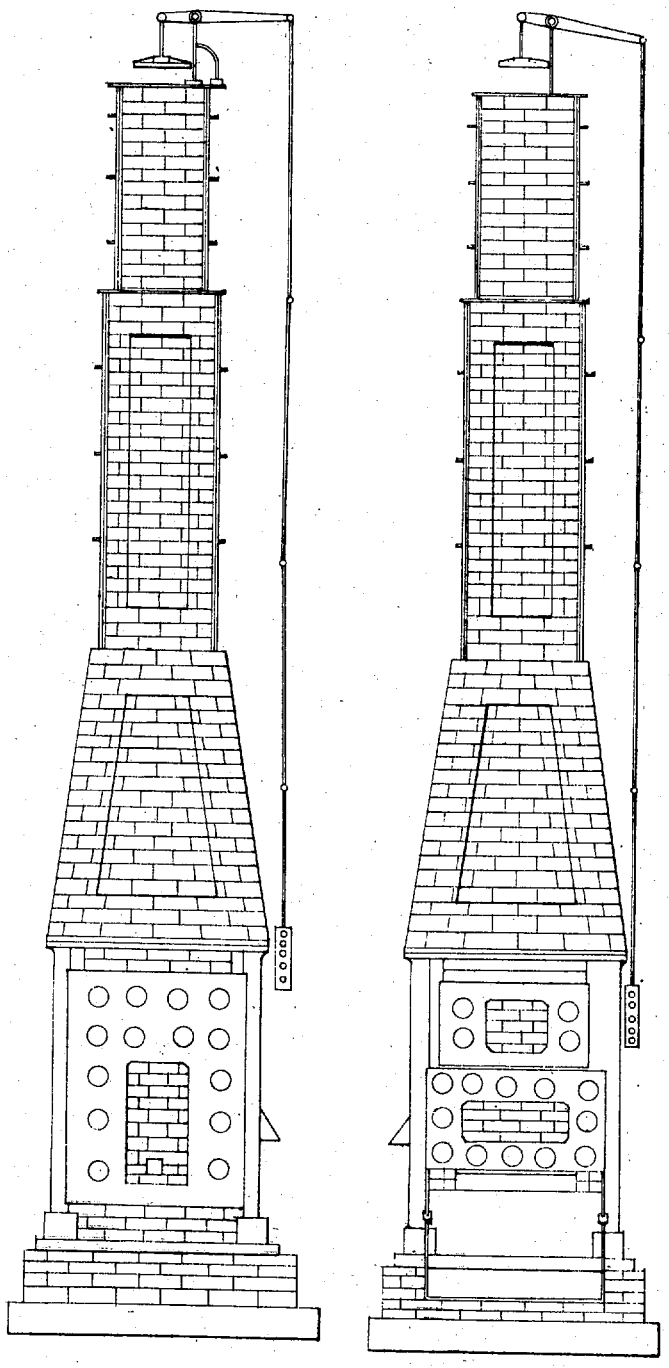

(3 Sheets) Sheet 2.
7861X
W. Jones.
Furnace
Patented Dec. 16th 1833
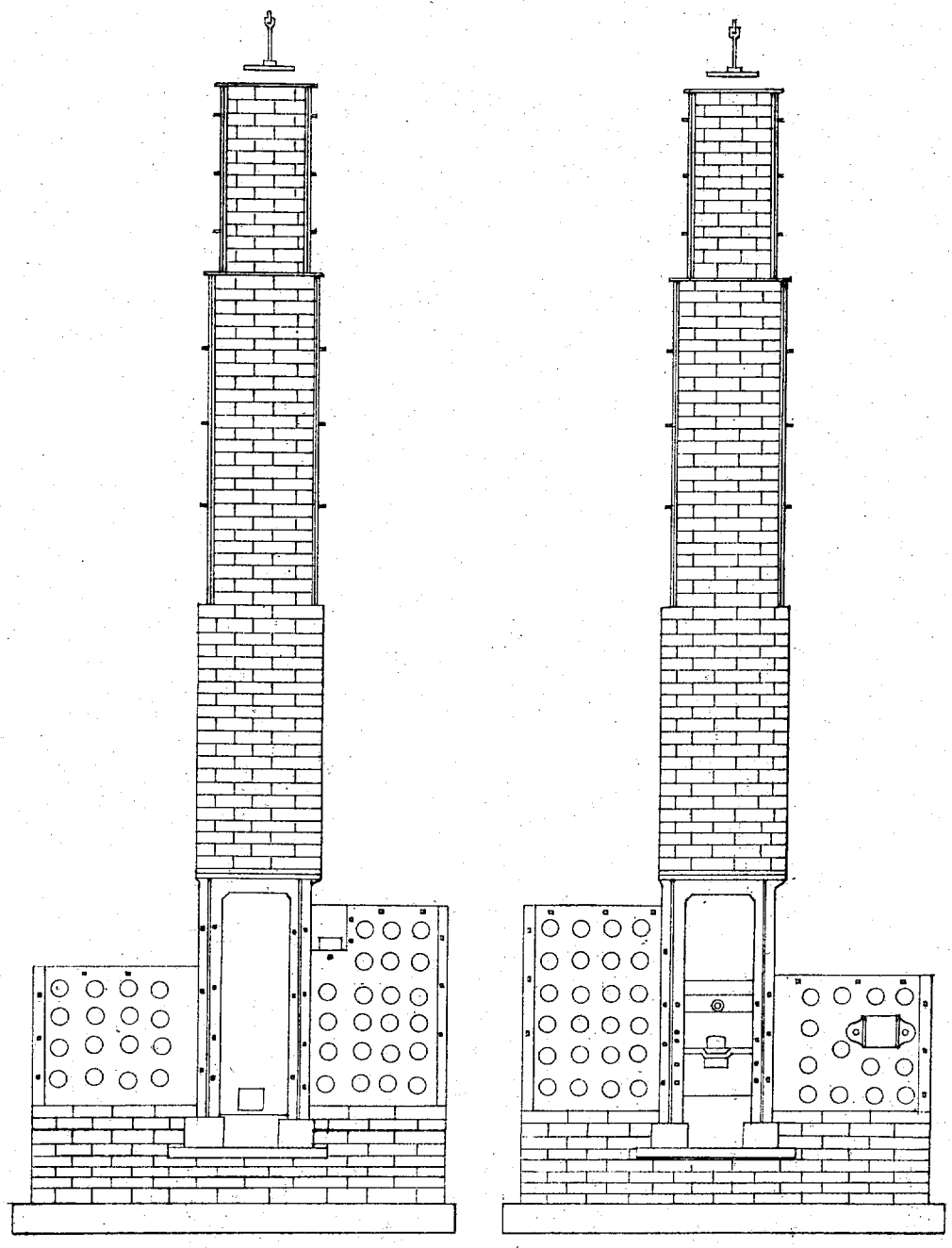

(3 Sheets) Sheet 3
7861X
W. Jones.
Furnace
Patented Dec. 16th 1833
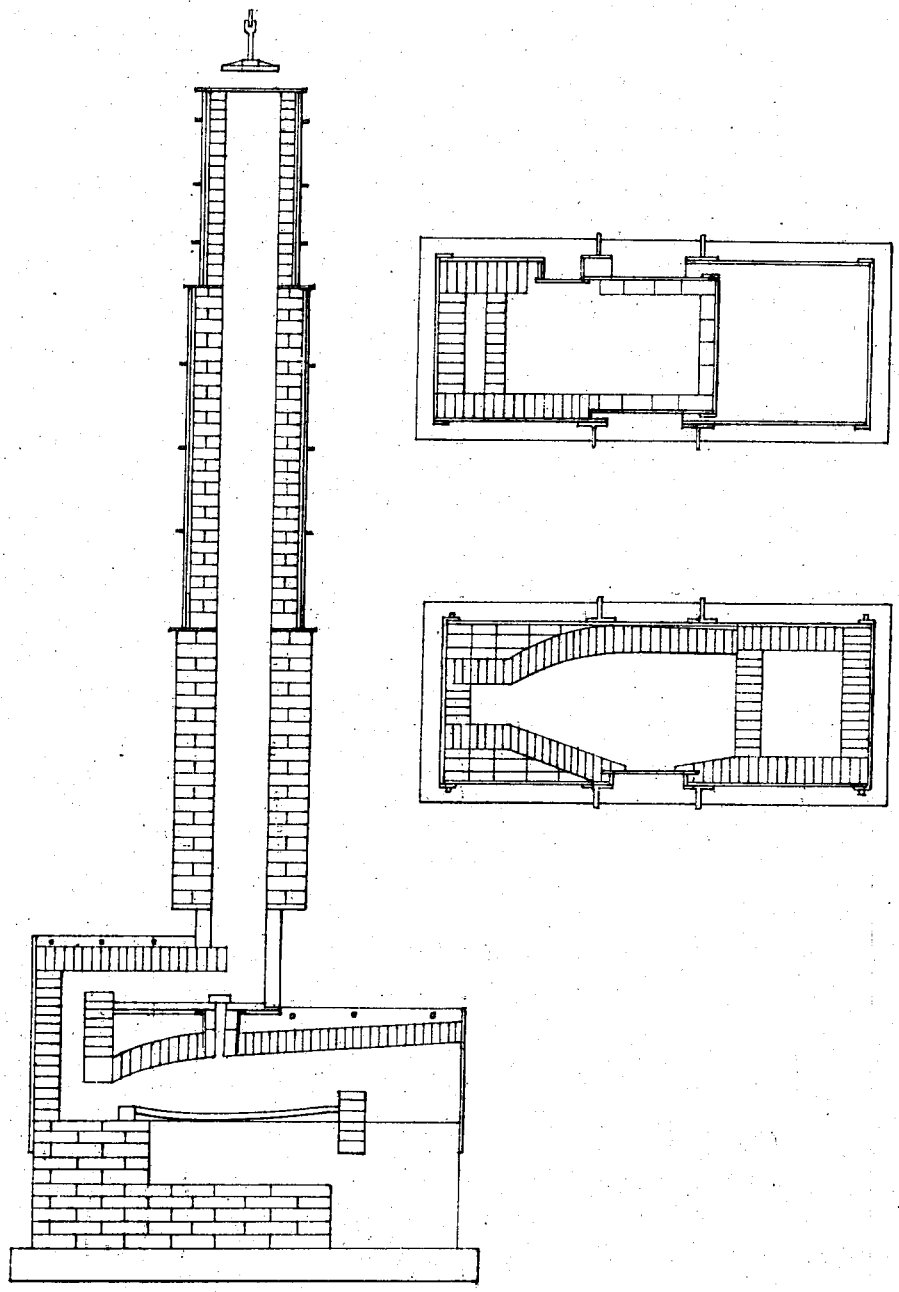

N. 11
Dec 16, 1833 323

William Jones. Haverstraw Rockland Co. N York
7861X

Letters Patent

The Schedule referred to in these Letters Patent and making part of the same containing a description in the words of the said William Jones himself of his improvement in the manufacture of iron in the two processes of it called puddling and heating.

To all to whom these presents shall come.
Be it known that I William Jones of Haverstraw in the County of Rockland and State of New York have invented a new and useful improvement in the manufacturing of iron in the two processes of it called puddling and heating and that the following is a full and exact description of the construction and operation of said improvement as invented by me.

The improvement consists of a stove or heating apartment attached to and connected with a puddling furnace and heated with the same fire as the one by which the puddling furnace is worked. The ground plan or foundation of the furnace is a rectangular parallelogram about 14 feet long by 7 feet broad and consists of a layer of stone & brick upon this the walls of the furnace consisting of brick work and corresponding in exterior form with the foundation are erected. The height of the wall on the right side is about seven feet. And on the left side about 7 feet 3 ins each being well secured with iron plates or binders.

The stack or chimney rises from the center of the furnace & is of the usual form. the flue being rather larger than common. The furnace internally is divided into three compartments communicating with one another viz. the stove coal or fuel apartment and the puddling apartment which are on the same level [illegible] & the stove or heating apartment which is over the puddling apartment — Over the stove coal and puddling apartment

7861X is an arched roof of Brick extending lengthways from the right side to within about 9 inches of the wall on the left side thus leaving a flue of that width on the left side The height of the Roof on the right side from the floor of the stove coal apartment is about 2 feet 4 inches and at its termination near the left side and at the mouth of the puddling apartment about 10 inches Thro' this Roof is an aperture nearly over the centre of the puddling apartment about seven inches by four inches dimensions communicating with the heating apartment above & thro' which the iron when properly heated is dropped into the puddling apartment which is of an elliptical form with a cast iron bottom or floor — The coal and iron in the stove coal and puddling apartments are prevented from mixing by a row of bricks called the bridge of about a foot in height extending across and separating the two apartments — The flame from the stove coal or fuel apartments which is on the right wing is carried horizontally across the puddling apartment to the flue in the left wing before mentioned thro which it passes to the heating apartment & thence horizontally across the heating apartment to the stack where it is finally conveyed off. The process of operation is to charge the stove or heating apartment with pig iron refined metal blooms billets Bars or other iron cut into pieces about 6 inches in length by 3 inches diameter, which is heated into nearly a melting state and when so heated is conveyed through the aperture before mentioned into the puddling apartment & there wrought into balls without the necessity of a fresh fire being put on Witnesses
A. Bowditch Blunt.
William T. Jones William Ines.

616 [illegible]

(Granted December 16. 1833)

Dr in portfolio